United States Patent
Adachi et al.

(10) Patent No.: US 6,829,820 B2
(45) Date of Patent: Dec. 14, 2004

(54) METHOD OF MANUFACTURING TEMPERATURE SENSOR AND TEMPERATURE SENSOR MANUFACTURED THEREBY

(75) Inventors: Tomohiro Adachi, Kariya (JP); Atsushi Kurano, Paris (FR)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/359,564

(22) Filed: Feb. 7, 2003

(65) Prior Publication Data

US 2003/0147452 A1 Aug. 7, 2003

(30) Foreign Application Priority Data

Feb. 7, 2002 (JP) ......................... 2002-030926

(51) Int. Cl.[7] .................. G01K 7/16; G01K 1/08; H01C 1/02; H01C 17/02
(52) U.S. Cl. .................. 29/613; 29/612; 29/616; 338/25; 338/28; 374/185; 374/208
(58) Field of Search .................. 29/612, 613, 614, 29/616, 620; 338/25, 28, 22 R, 229, 226; 374/185, 183, 208, 148

(56) References Cited

U.S. PATENT DOCUMENTS 1,523,434 A * 1/1925 Lightfoot et al. ............ 29/616
1,669,385 A * 5/1928 Wiegand et al. ............ 29/614
2,780,703 A * 2/1957 Macintyre ..................... 338/28
4,512,827 A * 4/1985 Gill ............................. 29/614
5,481,240 A * 1/1996 Fukaya et al. ............. 338/22 R
6,297,723 B1 * 10/2001 Shoji et al. ................... 338/28
6,466,123 B1 * 10/2002 Kuzuoka et al. ............. 338/25

FOREIGN PATENT DOCUMENTS

| DE | 19908444 | 9/1999 |
|----|----------|--------|
| JP | 57201826 | 12/1982 |
| JP | 60004832 | 1/1985 |
| JP | 10-318850 | 12/1998 |
| JP | 10332495 | 12/1998 |
| JP | 11295156 | 10/1999 |

* cited by examiner

Primary Examiner—Diego Gutierrez
Assistant Examiner—Stanley J. Pruchnic, Jr.
(74) Attorney, Agent, or Firm—Nixon & Vanderhye P.C.

(57) ABSTRACT

A temperature sensor for detecting a temperature of, for example, an exhaust gas of a vehicle is manufactured by inserting a thermistor element into a bottomed metal tube while filling an inside of the metal tube with a filler material, preferably of silicone oil, to reduce a sliding resistance between the thermistor element and the metal tube as an integral temperature sensing structure which is then mounted in a housing.

25 Claims, 2 Drawing Sheets

METHOD OF MANUFACTURING TEMPERATURE SENSOR AND TEMPERATURE SENSOR MANUFACTURED THEREBY

BACKGROUND OF THE INVENTION

The present invention relates to a method of manufacturing a temperature sensor for detecting a temperature by utilizing a thermistor element disposed inside a metal tube particularly for detecting an exhaust gas temperature of a vehicle and also relates to a temperature sensor manufactured thereby.

As a prior art, there is provided, for example, Japanese Patent Laid-open (KOKAI) Publication No. HEI 10-318850 which shows a temperature sensor in which a temperature detecting element having an electrode wire is disposed in a bottomed cylindrical metal tube for detecting an exhaust gas temperature of a vehicle, for example. More in detail, in this example, a temperature sensor has a metal cap usable at a temperature of more than 1000° C., and inside the cap, there is disposed a temperature detecting element so as not to be directly exposed to reducing atmosphere due to oxidation of an inside surface of the cap.

In the temperature detecting device of the structure mentioned above, a coating film is formed to an inside surface of the bottomed end portion of the cap. This coating film is formed of an inorganic oxide and the temperature detecting element is inserted in such metal cap.

By the way, when it has been required to reduce a diameter of the metal tube to improve response time or responsibility of the temperature sensor, a clearance between the inner peripheral surface of the metal tube and the outer peripheral surface of the thermistor element becomes reduced. In the case of small clearance, there may cause a fear or defect that the thermistor element contacts the inner peripheral surface of the metal tube at the time of insertion of the thermistor element into the metal tube, the electrode wire of the thermistor element is engaged with the metal tube due to sliding resistance therebetween and then bent, and therefore, it becomes difficult to insert the thermistor element to the bottom portion of the metal tube. As a result, the arrangement of the thermistor element in the metal tube becomes irregular and, due to such irregularity of the arrangement of the thermistor element, constant measurement precision cannot be achieved.

SUMMARY OF THE INVENTION

The present invention was conceived in consideration of the defects or drawbacks encountered in the prior art mentioned above and an object of the present invention is, therefore, to provide a method of manufacturing a temperature sensor, in which a thermistor element is disposed in a bottomed cylindrical metal tube, capable of substantially eliminating unevenness in measurement precision and also to provide a temperature sensor having an improved structure manufactured by the method mentioned above.

This and other objects can be achieved according to the present invention by providing, in one aspect, a method of manufacturing a temperature sensor which comprises a bottomed metal tube and a thermistor element inserted into the metal tube, comprising the steps of:

preparing a metal tube and a thermistor element; and inserting the thermistor element into the metal tube while filling an inside of the metal tube with a filler material to reduce a sliding resistance between the thermistor element and the metal tube.

In another aspect of the present invention, there is provided a method of manufacturing a temperature sensor which comprises a bottomed metal tube and a thermistor element inserted into the metal tube, comprising the steps of:

preparing a metal tube and a thermistor element;

positioning an insertion side front end of the thermistor element to an open end portion of the metal tube;

filling an inside of the metal tube with a filler material through a clearance between the front end of the thermistor element and the metal tube to reduce a sliding resistance between the thermistor element and the metal tube; and inserting the thermistor element into the metal tube.

In a further aspect of the present invention, there is also provided a method of manufacturing a temperature sensor which comprises a bottomed metal tube and a thermistor element inserted into the metal tube, comprising the steps of:

preparing a metal tube and a thermistor element;

filling an inside of the metal tube with a filler material;

positioning an insertion side front end of the thermistor element to an open end portion of the metal tube; and inserting the thermistor element into the metal tube while further filling the inside of the metal tube with the filler material through a clearance between the front end of the thermistor element and the metal tube to reduce a sliding resistance between the thermistor element and the metal tube.

Preferred examples of the above aspects may provide the following features or characters.

The filler material is a silicone oil. The silicone oil has a viscosity of 100 to 1500 cm·stokes, preferably of 500 to 800 cm·stokes.

The metal tube has an outer diameter of 0.5 to 1.5 mm.

An ambient temperature of a portion to be detected is −40 to 1000° C.

The metal tube has a depth of 5 to 25 mm from an opened end of the bottomed metal tube to the bottom portion thereof.

Furthermore, the filler material is a silicone oil and the metal tube is heated after the insertion of the thermistor element thereinto so as to volatilize an oil component of the silicone oil.

Still furthermore, the filler material is a silicone oil, ceramics powder is mixed with the silicone oil and the metal tube is heated after the insertion of the thermistor element thereinto so as to volatilize an oil component of the silicone oil and to sinter the ceramics powder to thereby secure the thermistor element to the metal tube.

In a detailed aspect of the present invention, there is provided a method of manufacturing a temperature sensor which comprises a bottomed metal tube and a thermistor element inserted into the metal tube, comprising the steps of:

preparing a metal tube and a thermistor element provided with an electrode wire from which a lead wire extends, a terminal being connected to the lead wire;

inserting the thermistor element into the metal tube while filling an inside of the metal tube with a filler material, preferably of silicone oil, to thereby form an integral structure of the metal tube and the thermistor element;

mounting the integral structure to a housing from which the bottomed end portion of the metal tube extends outward; and feeding an electrical insulating material into the housing.

In the other aspect, the present invention provides a temperature sensor comprising:

a bottomed metal tube;

a thermistor element provided with an electrode wire from which a lead wire extends, the thermistor element being inserted into the metal tube;

a terminal electrically connected to the lead wire;

a filler, preferably a silicone oil, charged into the metal tube, the metal tube, the thermistor element and the filler being formed into an integral structure; and a housing into which the integral structure is mounted so that the bottomed end portion of the metal tube extends outward the housing.

According to the preferred embodiments or examples of the characters mentioned above, since the filler, preferably of silicone oil, is applied between the metal tube and the thermistor element, the sliding resistance can be made at the time of insertion of the thermistor element into the metal tube smoothly to the bottom portion thereof, thus improving the temperature measuring performance, for example, of an exhaust gas of a vehicle.

The insertion of the filler beforehand the insertion of the thermistor element into the metal tube can enhance the smooth and accurate insertion thereof.

In the preferred embodiment, when the metal tube is heated after the insertion of the thermistor element with the silicone oil, the oil component of the silicone oil volatilized and only the solid silica powder remains in the metal tube, whereby the leakage of liquid component during the use of the temperature sensor can be prevented.

Furthermore, by mixing the ceramics powder with the silicone oil and sintering the ceramics powder, the thermistor element can be effectively secured to the metal tube.

The temperature sensor manufactured by the method of the present invention can achieve the improved temperature detection function.

The nature and further characteristic features of the present invention will be made more clear from the following descriptions made with reference to the accompanying drawings.

DESCRIPTION OF THE PREFERRED EMBODIMENT

Preferred embodiments of the present invention will be described hereunder with reference to the accompanying drawings.

First Embodiment

Figure 1:
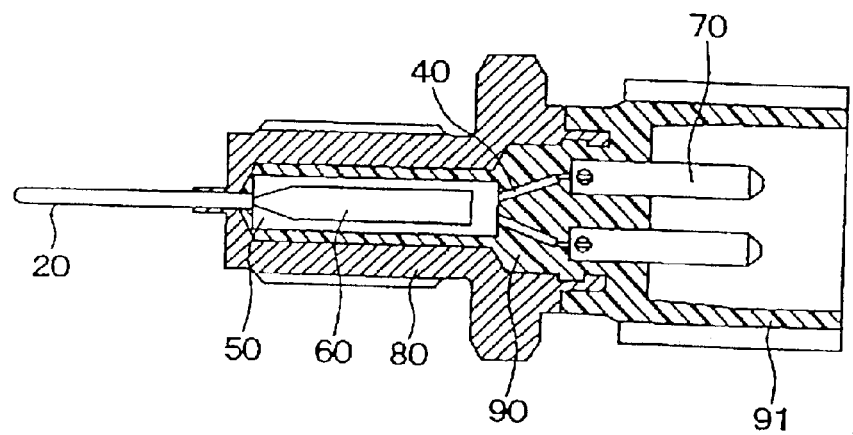
FIG. 1 is a sectional view of a temperature sensor according to a first embodiment of the present invention.
Figure 2:
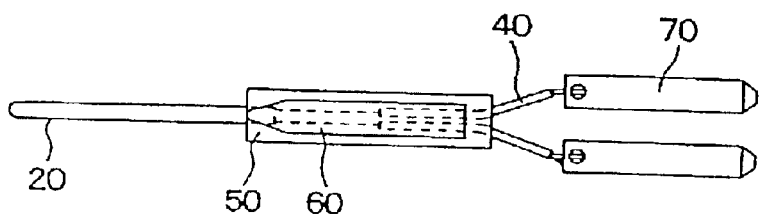
FIG. 2 is an illustration of an outer appearance of an essential portion of the temperature sensor of FIG. 1.
Figure 3:
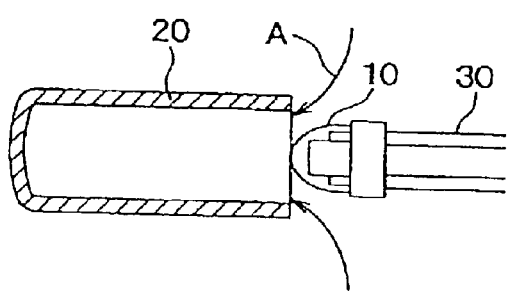
FIG. 3 is an illustration of an essential portion, i.e., temperature sensing structure, of the temperature sensor in a developed state for assembling.

A first embodiment of the present invention is first described with reference to FIGS. 1 to 3, in which FIG. 1 shows a sectional view of an entire structure of a temperature sensor, FIG. 2 shows an outer appearance of a temperature sensing portion and a terminal of the temperature sensor, and FIG. 3 is the developed view for the explanation of assembling of the temperature sensing portion.

The temperature sensor of this first embodiment is especially utilized for detecting a temperature of an exhaust gas from an internal combustion engine of a vehicle.

With reference to FIGS. 1 to 3, the temperature sensor of this embodiment generally comprises a thermistor element 10, a metal tube 20, a pair of electrode wires 30 extending from the thermistor element 10, a pair of lead wires 40 electrically connected to the electrode wires 30, respectively, and covered by a tube, and terminals 70 connected to the lead wires 40, as illustrated in FIG. 2.

The thermistor element 10 is for high temperature use capable of withstanding high temperature of an exhaust gas of a vehicle, for example, more than 1000° C. This thermistor element 10 is formed from ceramics or silicon semiconductor, having a resistance variable in response to variation of the temperature. The thermistor element 10 generally has a shell shape as shown in FIG. 3.

The thermistor element 10 is inserted into the metal tube 20, which is made of stainless steel of, for example, SUS 304, SUS 303, or SUS 310. The metal tube 20 has a bottomed cylindrical shape having one end opened and the other end closed.

A pair of electrode wires 30 made of platinum wires, for example, extend from the thermistor element 10 and electrically connected, at the extending ends, to the end portions of the paired lead wires 40, respectively, by means of, for example, welding.

After the insertion of the thermistor element 10 into the metal tube 20 and the connection of the electrode wires 30 to the lead wires 40, the metal tube 20 with the thermistor element 10 is inserted into a box 50, having ⊐-shaped (inverted gate-shaped) section, made of resin such as polyphenylene sulfide, and then, the electrode wires 30 and the lead wires 40 are also inserted in the box 50. Thereafter, the box 50 is filled up with an epoxy resin so as to form an epoxy resin layer 60 in the box 50 as illustrated in FIG. 2.

Thereafter, end portions of the lead wires 40 extending beyond one end portion of the box 50 are electrically connected, by means of welding, for example, to the paired metal terminals 70. According to such connection as mentioned above, the thermistor element 10, the metal tube 20, the electrode wires 30, the lead wires 40 and the terminals 70 are integrally connected. This integrated structure is then inserted into a metal cylindrical housing 80 having a staged portion such that the bottom end of the metal tube 20 extends outward over one end of the housing 80, and thereafter, a resin material such as nylon having an electrical insulating property is injected and molded, thus completing the temperature sensor such as shown in FIG. 1 according to the present invention.

With further reference to FIG. 1, reference numeral 90 denotes a resin mold having an end portion, extending from the housing 80, to which a connector housing 91 is connected integrally, and one end of each of the terminals 70 extends inside the connector housing 91.

The housing 80 is formed, on its outer peripheral surface, with male screw thread, and by utilizing this screw thread, the temperature sensor is mounted (i.e. screw-engaged) to an exhaust pipe of an internal combustion engine of a vehicle, not shown, in a manner that the bottom side of the metal tube 20 faces inside the exhaust pipe. According to such mounting of the temperature sensor to the exhaust pipe, the resistance value of the thermistor element 10 varies in response to the temperature of the exhaust gas to thereby detect the temperature of the exhaust gas.

With the temperature sensor of the structure mentioned above, the inserting and assembling processes of the thermistor element 10 to the metal tube 20 will be explained with reference to FIG. 3.

An operator holds the electrode wires 30 so that the front end of the thermistor element 10 is positioned to the opened end of the metal tube 20 with a clearance between the inner peripheral surface of the metal tube 20 and the outer peripheral surface of the thermistor element 10 in a state now illustrated in FIG. 3. Then, while feeding a filler inside the metal tube 20, as shown with a letter A in FIG. 3, through the clearance, the electrode wires 30 are pushed so that the thermistor element 10 is inserted into the metal tube 20 to a position that the inserted front end of the thermistor element 10 abuts against the bottom portion of the metal tube 20.

As the filler, silicone oil is preferably utilized in this embodiment for reducing a sliding resistance between the thermistor element 10 and the metal tube 20, and the silicone oil fills the metal tube 20 by using an injector, for example. This silicon oil may be being injected till the entire structure of the thermistor element 10 is inserted into the metal tube 20 or the front end of the thermistor element 10 abuts against the bottom portion of the metal tube 20.

Further, in order to sufficiently reduce the sliding resistance between the thermistor element 10 and the metal tube 20, it is preferred to set viscosity of the silicone oil of 100 to 1500 cSt (cm·stokes) or to use silicone oil having viscosity of 100 to 1500 cSt (cm·stokes), and more preferably, of 500 to 800 cSt. In a case when silicone oil having viscosity in a range other than that mentioned above is used, it will be difficult to sufficiently reduce the sliding resistance, and in such case, it will be necessary to control or manage temperature and moisture.

In a preferred example, the gap between the thermistor element 10 and the metal tube 20 is desired to be about 0.01 to 0.5 mm in diametrical direction. In a case of less than 0.1 mm, it is difficult to insert the thermistor element 10 into the metal tube regardless of the presence the filler, and in a case of more than 0.5 mm, the thermistor element 10 will engage without the filler.

Further, it will be also desired that the silicone oil as the filler applied to the metal tube surface has a thin thickness in form of film.

According to the embodiment described above, the sliding resistance between the thermistor element 10 and the metal tube 20 is made small by the silicone oil, so that only a small force is applied to the electrode wires 30, and hence, it is prevented for the electrode wires 30 from being bent and it becomes possible to insert the thermistor element 10 to the bottom portion of the metal tube 20. Accordingly, the thermistor element 10 is surely positioned to the bottom portion of the metal tube 20, thus improving the measuring performance.

In one example of a temperature sensor adapted to detect a temperature of an exhaust gas from a vehicle, an outer diameter (φ) of the metal tube 20 is set to 0.5 to 1.5 mm, a depth of the metal tube 20 from its opened end to its bottom portion is set to 5 to 25 mm, and a temperature ambient of the temperature of an inside portion of an exhaust tube, at which the bottom portion of the metal tube 20 is positioned (i.e., a portion at which a temperature is detected), is about −40 to 1000° C.

As mentioned above, in the case of severe ambient of the temperature at the portion to be detected, it is difficult to make small the thermistor element 10, and in addition, since the outer diameter of the metal tube 20 is small, the clearance between the thermistor element 10 and the metal tube 20 inevitably becomes small.

On the contrary, according to the described first embodiment of the present invention, in which the silicone oil is utilized as filler, the thermistor element 10 can be surely inserted into the bottom portion of the metal tube 20 even in the case of the small clearance between the thermistor element 10 and the metal tube 20. Accordingly, the present invention is preferably applicable to a temperature sensor, for detecting a temperature of an exhaust gas, having a small clearance therebetween.

Second Embodiment

In this second embodiment, silicone oil fills the inner space of the metal tube 20 before the thermistor element 10 is inserted therein, and the technology other than this matter is substantially the same as that of the first embodiment.

Figure 4:
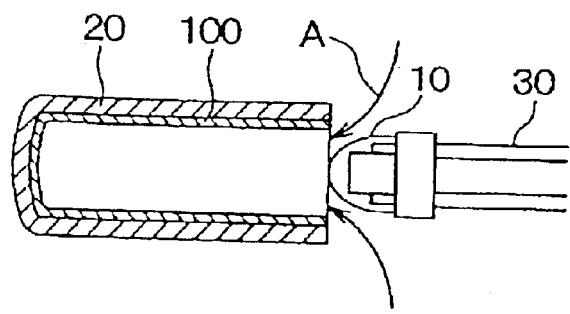
FIG. 4 is an illustration of developed view, similar to FIG. 3, of a temperature sensor according to a second embodiment of the present invention.

In this second embodiment, with reference to FIG. 4, the silicone oil is first fed into the metal tube 20 to thereby form a silicone oil film layer 100 so as to cover the inner peripheral wall surface of the metal tube 20. Thereafter, the thermistor element 10 is positioned by holding the electrode wires 30 so that the front end of the thermistor element 10 is positioned to, the opened end portion of the metal tube 20. Under the state, while pouring the silicone oil into the metal tube through the clearance as shown with letter A in FIG. 4 between the outer peripheral surface of the thermistor element 10 and the inner peripheral surface of the metal tube 20, the thermistor element 10 is pushed forward by holding the electrode wires 30 and inserted into the metal tube 20 till the inserted front end of the thermistor element 10 abuts against the bottom portion of the metal tube 20.

As mentioned above, by preliminarily filling the inside of the metal tube 20 with the silicone oil and forming the silicone oil film layer 100, the siding resistance between the thermistor element 10 and the metal tube 20 can be surely reduced and the thermistor element 10 can be surely and easily inserted into the bottom portion of the metal tube 20.

Further, in this embodiment, since the silicone oil film layer 100 is preliminarily formed on the inner wall section of the metal tube 20, the feeding of the silicone oil at the thermistor element insertion time through the clearance may be eliminated.

Third Embodiment

This third embodiment represents another inserting and assembling process of the thermistor element to the metal tube 20, and descriptions on processes or steps substantially equal to those of the first embodiment will be omitted hereunder.

Figure 5:
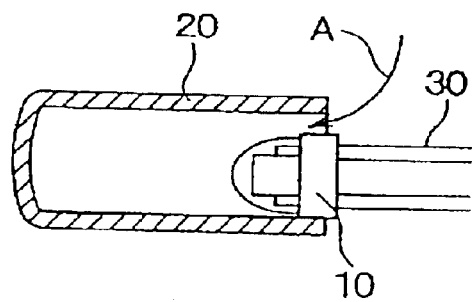
FIG. 5 is an illustration of developed view, similar to FIG. 3, of a temperature sensor according to a third embodiment of the present invention.

In this third embodiment, with reference to FIG. 5, the front end portion of the thermistor element 10 is inserted into the metal tube 20 by holding the electrode wires 30 so that the lower side of the thermistor element 10 contacts the lower inner peripheral surface of the metal tube as just shown in FIG. 5. Under the state, the silicone oil is fed inside the metal tube 20 shown with the letter A through the clearance between the thermistor element 10 and the metal tube 20 at the upper side to thereby surely apply the silicone oil to the upper side inner peripheral surface of the metal tube 20 and the outer peripheral surface of the thermistor element 10.

Then, the thermistor element 10 is raised upward and then inserted into the metal tube 20 till the front end of the thermistor element 10 abuts against the bottom portion of the metal tube 20.

As mentioned above, according to this embodiment, since the thermistor element 10 is inserted in contact to the portion to which the silicone oil is surely applied, the siding resistance between the thermistor element 10 and the metal tube 20 can be surely reduced and the thermistor element 10 can be surely and easily inserted into the bottom portion of the metal tube 20.

Hereunder, fourth embodiment and fifth embodiment of the present invention will be further described, which additionally include processes or steps after those of the first to third embodiments mentioned above.

Fourth Embodiment

The fourth embodiment includes further step after the inserting and assembling the thermistor element 10 in the metal tube 20.

That is, the metal tube 20 of the temperature sensor into which the thermistor element 10 has been inserted in accordance with any one of the first to third embodiments is then heated at a temperature of more than 400° C. for more than 5 minutes. Through this heating process, oil component of the silicone oil volatiles, and hence, silica ($SiO_2$) exists in the metal tube 20 in solid powder state, whereby any liquid state material does not remain therein and hence does not leak during the usage of the temperature sensor.

Fifth Embodiment

In this fifth embodiment, ceramics powder such as $Al_2O_3$, MgO, $SiO_2$ or like is preliminarily added to the silicone oil before the filling into the metal tube 20. The processes or steps carried out in any one of the first to third embodiments are then applied. Thereafter, the metal tube 20 is then heated at a temperature of more than a ceramics sintering temperature for a predetermined time. Through this heating process, the ceramics is sintered in the metal tube and the thermistor element 10 is hence secured to the metal tube 20.

As mentioned hereinbefore, according to the present invention, the required objects can be achieved.

It is further to be noted that the present invention is not limited to the described embodiments and many other changes and modifications may be made without departing from the scopes of the appended claims.

What is claimed is:

1. A method of manufacturing a temperature sensor which comprises a bottomed metal tube and a thermistor element inserted into the metal tube, comprising the steps of:
   preparing a metal tube and a thermistor element; and
   inserting the thermistor element into the metal tube while filling an inside of the metal tube with a filler material to reduce a sliding resistance between the thermistor element and the metal tube.

2. The method of manufacturing a temperature sensor according to claim 1, wherein said filler material is a silicone oil.

3. The method of manufacturing a temperature sensor according to claim 2, wherein said silicone oil has a viscosity of 100 to 1500 cm • stokes.

4. The method of manufacturing a temperature sensor according to claim 1, wherein said metal tube has an outer diameter of 0.5 to 1.5 mm.

5. The method of manufacturing a temperature sensor according to claim 1, wherein an ambient temperature of a portion to be detected is −40 to 1000° C.

6. The method of manufacturing a temperature sensor according to claim 1, wherein said metal tube has a depth of 5 to 25 mm from an opened end of the bottomed metal tube to the bottom portion thereof.

7. The method of manufacturing a temperature sensor according to claim 1, wherein said filler material is a silicone oil and said metal tube is heated after the insertion of the thermistor element thereinto so as to volatilize an oil component of the silicone oil.

8. The method of manufacturing a temperature sensor according to claim 1, wherein said filler material is a silicone oil, ceramics powder is mixed with the silicone oil and said metal tube is heated after the insertion of the thermistor element thereinto so as to volatilize an oil component of the silicone oil and to sinter the ceramics powder to thereby secure the thermistor element to the metal tube.

9. A method of manufacturing a temperature sensor which comprises a bottomed metal tube and a thermistor element inserted into the metal tube, comprising the steps of:
   preparing a metal tube and a thermistor element;
   positioning an insertion side front end of the thermistor element to an open end portion of the metal tube;
   filling an inside of the metal tube with a filler material through a clearance between the front end of the thermistor element and the metal tube to reduce a sliding resistance between the thermistor element and the metal tube; and
   inserting the thermistor element into the metal tube.

10. The method of manufacturing a temperature sensor according to claim 9, wherein said filler material is a silicone oil.

11. The method of manufacturing a temperature sensor according to claim 10, wherein said silicone oil has a viscosity of 100 to 1500 cm • stokes.

12. The method of manufacturing a temperature sensor according to claim 9, wherein said metal tube has an outer diameter of 0.5 to 1.5 mm.

13. The method of manufacturing a temperature sensor according to claim 9, wherein an ambient temperature of a portion to be detected is −40 to 1000° C.

14. The method of manufacturing a temperature sensor according to claim 9, wherein said metal tube has a depth of 5 to 25 mm from an opened end of the bottomed metal tube to the bottom portion thereof.

15. The method of manufacturing a temperature sensor according to claim 9, wherein said filler material is a silicone oil and said metal tube is heated after the insertion of the thermistor element thereinto so as to volatilize an oil component of the silicone oil.

16. The method of manufacturing a temperature sensor according to claim 9, wherein said filler material is a silicone oil, ceramics powder is mixed with the silicone oil and said metal tube is heated after the insertion of the thermistor element thereinto so as to volatilize an oil component of the silicone oil and to sinter the ceramics powder to thereby secure the thermistor element to the metal tube.

17. A method of manufacturing a temperature sensor which comprises a bottomed metal tube and a thermistor element inserted into the metal tube, comprising the steps of:
   preparing a metal tube and a thermistor element;
   filling an inside of the metal tube with a filler material;
   positioning an insertion side front end of the thermistor element to an open end portion of the metal tube; and
   inserting the thermistor element into the metal tube while further filling the inside of the metal tube with the filler material through a clearance between the front end of the thermistor element and the metal tube to reduce a sliding resistance between the thermistor element and the metal tube.

18. The method of manufacturing a temperature sensor according to claim 17, wherein said filler material is a silicone oil.

19. The method of manufacturing a temperature sensor according to claim 18, wherein said silicone oil has a viscosity of 100 to 1500 cm • stokes.

20. The method of manufacturing a temperature sensor according to claim 17, wherein said metal tube has an outer diameter of 0.5 to 1.5 mm.

21. The method of manufacturing a temperature sensor according to claim 17, wherein an ambient temperature of a portion to be detected is −40 to 1000° C.

22. The method of manufacturing a temperature sensor according to claim 17, wherein said metal tube has a depth of 5 to 25 mm from an opened end of the bottomed metal tube to the bottom portion thereof.

23. The method of manufacturing a temperature sensor according to claim 17, wherein said filler material is a silicone oil and said metal tube is heated after the insertion of the thermistor element thereinto so as to volatilize an oil component of the silicone oil.

24. The method of manufacturing a temperature sensor according to claim 17, wherein said filler material is a silicone oil, ceramics powder is mixed with the silicone oil and said metal tube is heated after the insertion of the thermistor element thereinto so as to volatilize an oil component of the silicone oil and to sinter the ceramics powder to thereby secure the thermistor element to the metal tube.

25. A method of manufacturing a temperature sensor which comprises a bottomed metal tube and a thermistor element inserted into the metal tube, comprising the steps of:

preparing a metal tube and a thermistor element provided with an electrode wire from which a lead wire extends, a terminal being connected to the lead wire;

inserting the thermistor element into the metal tube while filling an inside of the metal tube with a filler material to thereby form an integral structure of the metal tube and the thermistor element;

mounting said integral structure to a housing from which the bottomed end portion of the metal tube extends outward; and feeding an electrical insulating material into the housing.

* * * * *